United States Patent [19]

Testa

[11] Patent Number: 4,840,605
[45] Date of Patent: Jun. 20, 1989

[54] REAR DERAILER FOR BICYCLE GEARS

[75] Inventor: Sandro Testa, Perarolo, Italy

[73] Assignee: Campagnolo S.p.A., Vicanza, Italy

[21] Appl. No.: 215,155

[22] Filed: Jul. 5, 1988

[30] Foreign Application Priority Data

Jul. 2, 1987 [IT] Italy ............................... 67569 A/87

[51] Int. Cl.$^4$ ............................................ F16H 11/08
[52] U.S. Cl. ..................................................... 474/80
[58] Field of Search ..................................... 474/78–82

[56] References Cited

U.S. PATENT DOCUMENTS 4,061,048 12/1977 Huret et al. ............................ 474/82
4,610,644 9/1986 Nagano .................................. 474/82
4,642,072 2/1987 Nagano ............................. 474/80 X Primary Examiner—Thuy M. Bui
Attorney, Agent, or Firm—Sughrue, Mion, Zinn, Macpeak & Seas

[57] ABSTRACT

A rear derailleur for bicycle gears comprises an upper body which can be fixed to the bicycle frame, a lower body carrying a chain tensioning wheel for the bicycle chain and being movable relative to the upper body to bring the chain into selective engagement with a series of sprockets carried by the hub of the rear wheel of the bicycle, and a flexible cable for causing movement of the lower body. This lower body is carried by a control lever which is supported for rotation and axial sliding on a cylindrical guide element fixed to the upper body. Transmission device is interposed between the flexible cable and the control lever and is adapted simultaneously to impart rotation and axial sliding to the control lever, relative to the cylindrical guide element, as a result of operation of the flexible cable.

12 Claims, 5 Drawing Sheets

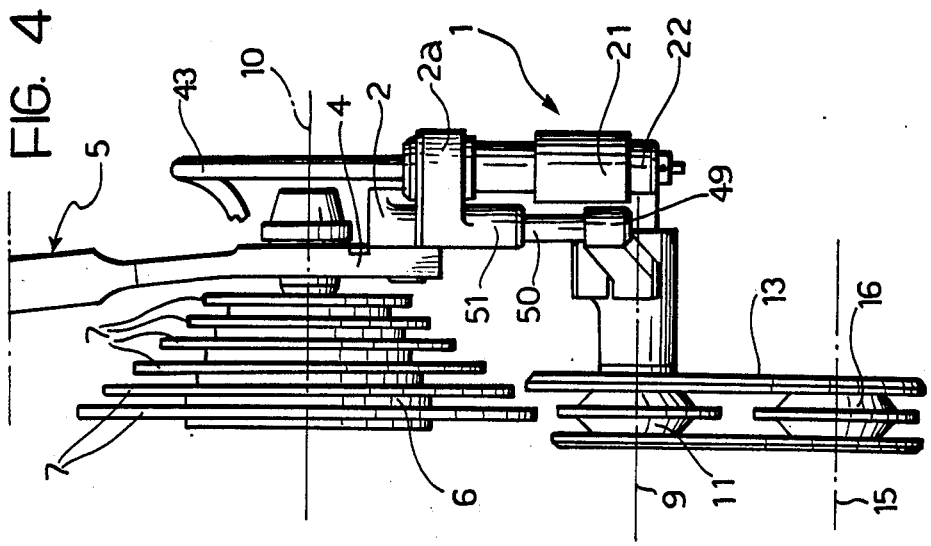
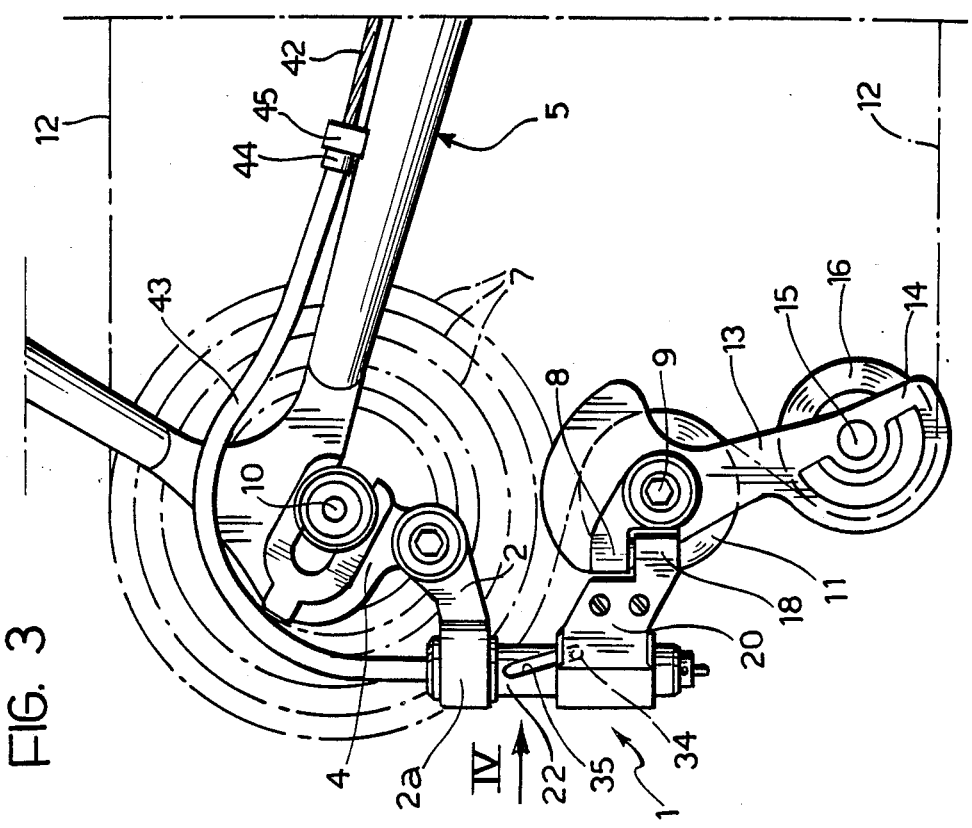

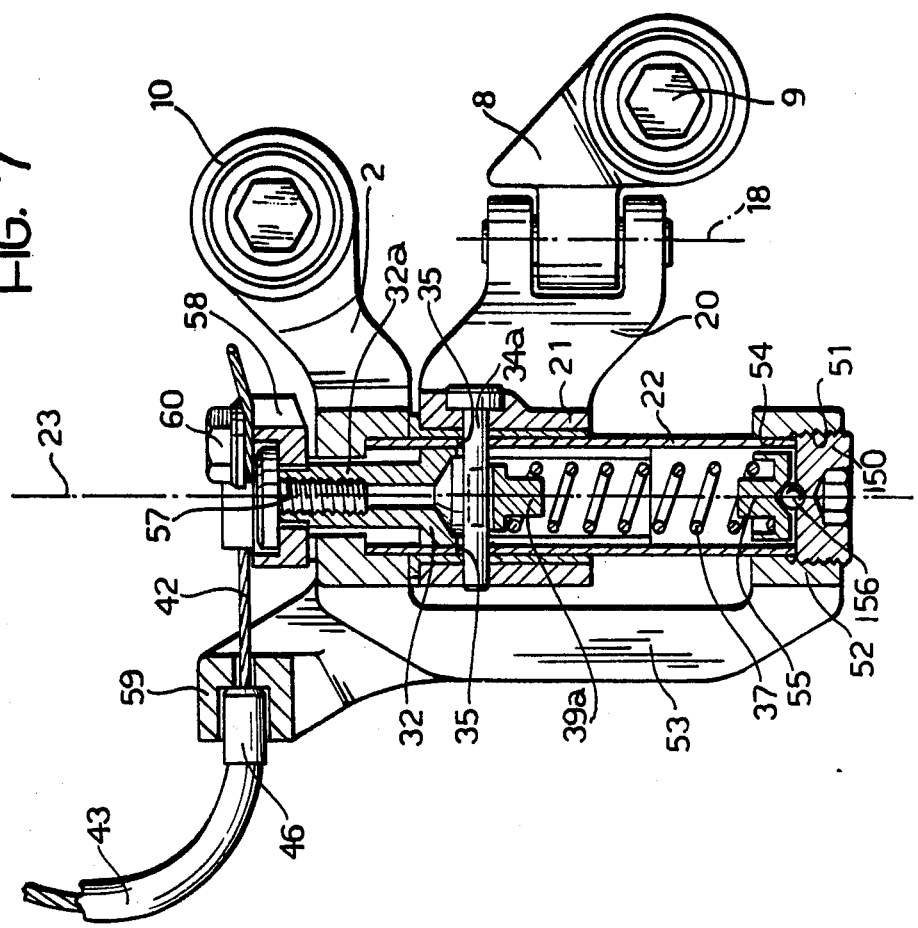
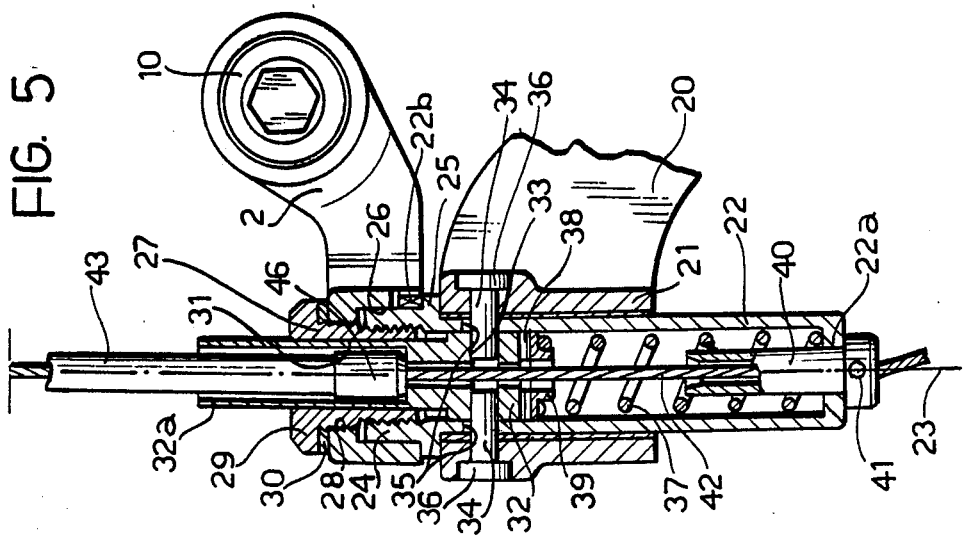

REAR DERAILLEUR FOR BICYCLE GEARS

DESCRIPTION

FIELD OF THE INVENTION

The present invention relates to rear derailleurs for bicycle gears, of the known type comprising:

an upper body which can be fixed to the bicycle frame, a lower body carrying transmission means for the bicycle chain and being connected to the upper body so as to be movable relative thereto to bring the chain into selective engagement with a series of sprockets carried by the hub of the rear wheel of the bicycle, and flexible cable means for causing movement of the lower body.

In rear derailleurs of the type indicated above, for efficient functioning of the derailleur, it is desirable that the distance between the chain transmission means and the teeth of the sprocket engaged with the chain which are nearest to the transmission means is kept as uniform as possible, whichever sprocket is selected. In other words, it is desirable that, when the chain is derailed from one particular sprocket to another sprocket of different diameter, the movement of the chain transmission means should have both a component parallel to the axis of the rear wheel of the bicycle (so as to cause derailing of the chain from one sprocket to another) and a component radial to that axis to allow for the different diameters of the sprockets.

SUMMARY OF THE INVENTION

The object of the present invention to produce a derailleur which is able to achieve the above result and has a compact and functional structure.

In order to achieve this object, the subject of the present invention is a rear derailleur of the type specified at the beginning of the present description, characterised in that the lower body of the derailleur is carried by a control lever which is supported for rotation and axial sliding on a cylindrical guide element fixed to the upper body, and in that transmission means are interposed between the flexible cable means and the control lever for simultaneously imparting rotation and axial sliding to the control lever - relative to the cylindrical guide member - as a result of operation of the flexible cable means, means also being provided for keeping the orientation of the lower body unchanged upon a variation of the control lever.

By virtue of the aforementioned characteristics, various advantages are obtained. In the first place, the device according to the invention is able to achieve quite considerable movement of the control lever along the axis of the cylindrical guide element. It is therefore possible to allow for very considerable differences in diameter between the sprockets, whilst at the same time keeping the dimensions of the derailer relatively small. This advantage is particularly marked in comparison with conventional solutions, in which the lower body of the derailleur is connected to the upper body by means of an articulated parallelogram joint pivoting in a plane parallel to the plane tangential to the lower part of the imaginary cone circumscribing the sprockets. In the second place, the particular structure described above enables the adoption of structural solutions which are more functional and reliable than known solutions.

BRIEF DESCRIPTION OF THE INVENTION

The characteristics and advantages of the invention will be described in the description which follows with reference to the appended drawings, provided purely by way of non-limiting example, in which:

FIG. 1 is a front view of a first embodiment of the derailleur according to the invention, FIG. 2 is a rear view of the derailleur of FIG. 1, taken on the arrow II of FIG. 1, FIG. 3 is a front view of the derailleur in a different operating condition, FIG. 4 is a rear view taken on the arrow IV of FIG. 3, FIG. 5 is a section taken on the line V—V of FIG. 2, FIG. 6 is a perspective view of the derailleur of FIGS. 1-4, FIG. 7 shows a variant of FIG. 5, and FIG. 8 shows a further variant.

DETAILED DESCRIPTION OF THE INVENTION

Figure 1:
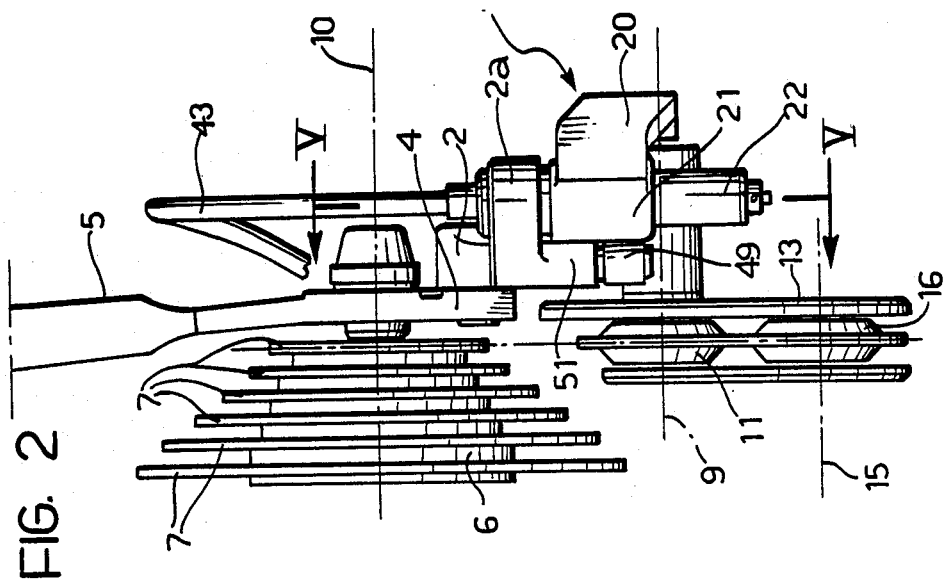

With reference to FIGS. 1 to 6, a rear derailleur for bicycles is generally indicated 1 and has an upper body 2 (see particularly FIGS. 1, 6) fixed by means of a screw 3 to an appendage 4 of the frame 5 of a bicycle, adjacent the hub 6 (FIG. 2) of the rear wheel of the bicycle. The hub 6 carries a series of sprockets 7, indicated only schematically in the drawings.

The derailleur 1 includes a lower body 8 connected to the upper body 2 in a manner which will be described in detail below and supporting a transmission wheel 11 for the chain (shown schematically by the line 12 in FIG. 1) for rotation about an axis 9 parallel to the axis 10 of the hub 6. The lower body 8 supports a chain-tensioning arm 13 which is also rotatable about the axis 9. The arm 13 terminates in an end 14 which supports a chain-tensioning wheel 16 for rotation about an axis 15 parallel to the axis 9. According to conventional techniques, resilient means (not illustrated) are provided between the lower body 8 and the arm 13 which tend to keep the arm rotated in a clockwise sense (with reference to FIG. 1) so as to keep the chain 12 tensioned.

The lower body 8 is articulated by means of an articulation pin with a vertical axis 18 to an end appendage 19 of a control lever 20 for controlling the movement of the lower body 8. The control lever 20 incorporates a hub 21 (see particularly FIG. 5) which is mounted for rotation and axial sliding on a cylindrical guide element 22. The latter is carried by the upper body 2 of the derailer and has an axis 23 parallel to the axis 18 of the articulation pin 17. The cylindrical guide element 22 has a hollow body with an upper end 24 which is internally threaded and is provided with a collar 25 at a certain distance from its head surface. The end 24 is housed in a cavity 26 formed in the lower surface of a cylindrical portion 2a of the upper body 2, with the collar 25 abutting this lower surface. The cylindrical guide element 22 is clamped axially against the upper body 2 by means of a threaded ring 27 which passes through a through-hole 28 formed in the upper body 2 and engages the internally threaded portion of the end 24. The ring 27 has an enlarged-diameter head 29 which bears on the upper surface of the part 2a with the interposition of a washer 30. The body 22 is prevented from rotation relative to the body 2 by a tooth 22b. In its turn, the ring 27 has an axial through-hole 31 in which is slidably mounted a tubular shank 32 ending at its lower end in a cylindrical body 32. The body 32 is mounted slidably within the cylindrical guide element 22 and has a transverse through-hole 33 in which the ends of two transverse pins 34 are fitted with interference from opposite sides. The pins 34 project outwardly of the cylindrical guide element 22 through two helical slots 35 (see FIG. 1). Axial movement of the body 32 within the cylindrical guide element 22 thus also causes rotation of the body about the axis 23, due to the engagement of the pins 34 in the two helical slots 35. The outer ends of the pins 34 are engaged in corresponding holes formed in the hub 21 of the control lever 20 and each terminates with a head 36. The hub 21 of the control lever 20 is thus rigidly connected to the slidable body 32 and follows the rotations and axial movements thereof. A helical spring, indicated 37, is interposed between the base wall 22a of the cylindrical guide element 22 and the lower surface of the slidable body 32. A washer 28 of plastics material with a low coefficient of friction is interposed between the lower surfaces of the body 32 and a metal ring 39 on which the upper end of the spring 37 bears. The washer 38 is provided since, in use, the body 32 can rotate relative to the cylindrical guide element 22 and consequently relative to the metal ring 39, as will become clear below. The end of the flexible metal cable 42 used for operating the derailer is fixed to the base wall 22a of the cylindrical guide element 22 by means of a tubular connector 40 provided with a stop screw 41. The opposite end of the cable 42 is connected to the usual gear-change lever (not visible in the drawings). The flexible cable 42 is also provided with a sheath 43 having an end 44 (FIG. 1) bearing against an appendage 45 of the bicycle frame 5, and an end 46 ((FIG. 5) bearing on a base wall of the tubular shank 32.

The lower body 8 of the derailer is also articulated by means of a pin 47 (FIG. 6) parallel to the pin 17 to one end of an auxiliary connecting rod 48 whose opposite end 49 (FIG. 6) is provided with a pin 50 (FIG. 4) which is mounted slidably and rotatably in an appendage 51 of the upper body 2.

Figure 2:
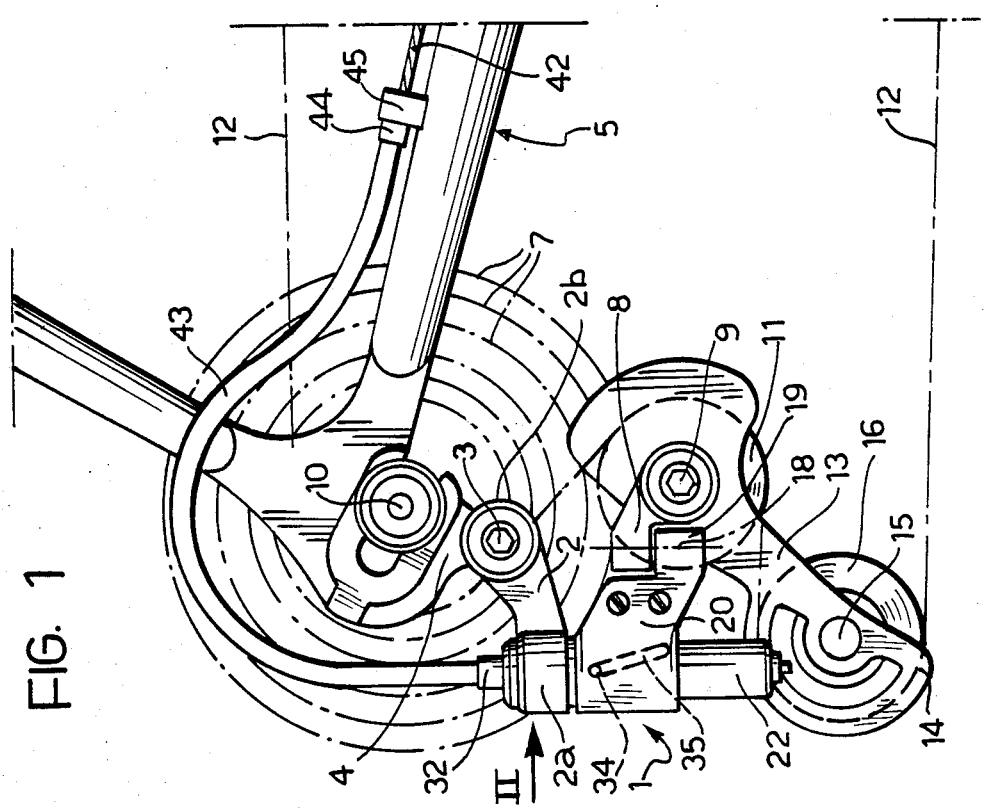
Figure 6:
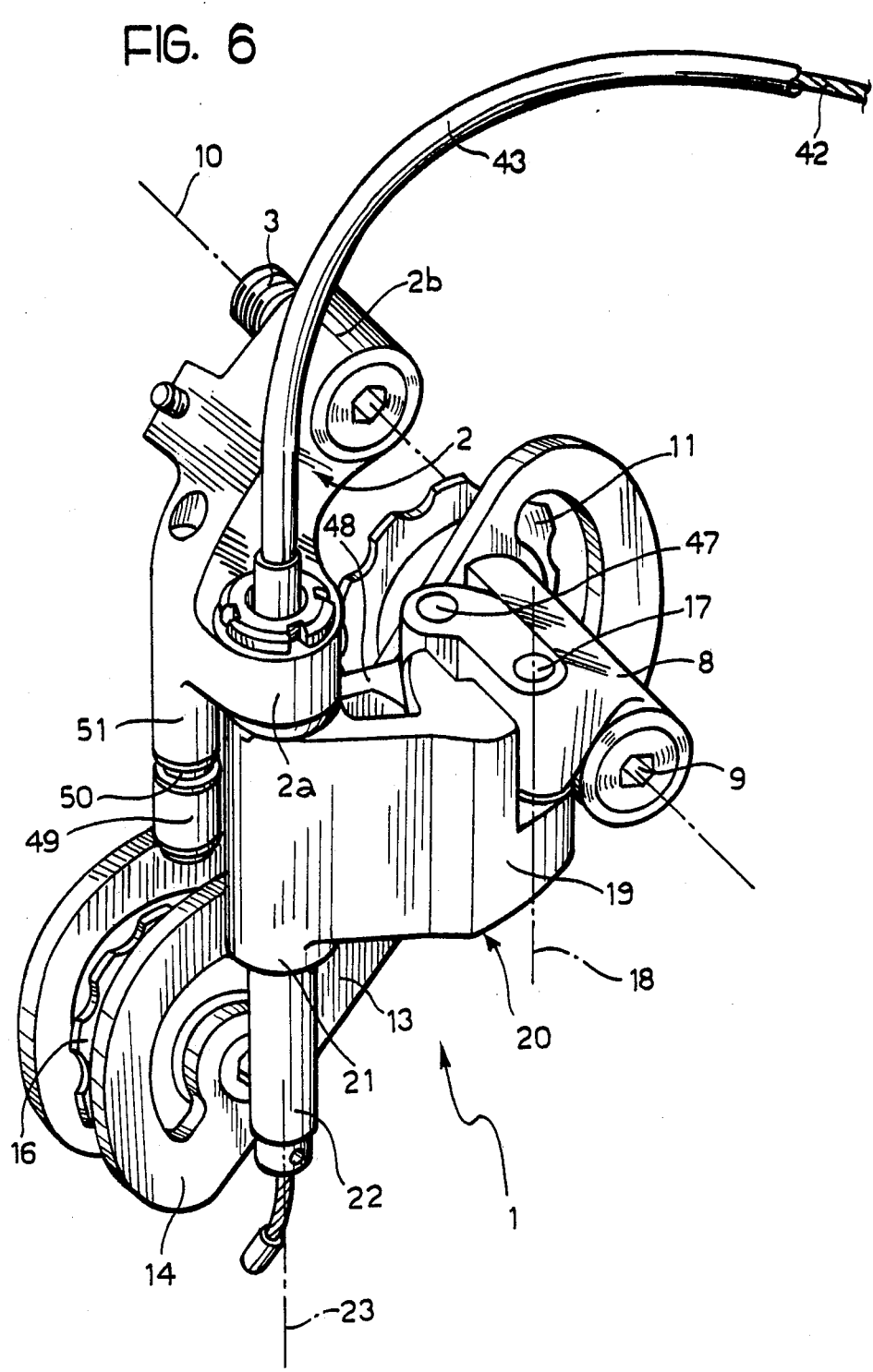

The operation of the above-described derailer is as follows:

The spring 37 FIG. 5) housed within the cylindrical guide element 22 tends to keep the lever 20 controlling the transmission wheel 11 of the derailer in the position illustrated in FIGS. 1 and 2, which corresponds to engagement of the chain 12 with the smallest-diameter sprocket 7. Supposing that the derailer is in this position when the cyclist wishes to derail the chain onto another gear, he operates the gear-change lever (not illustrated) to tension the flexible metal cable 42. As already stated, the opposite end of the cable 42 is fixed to the base wall 22a of the cylindrical guide element 22 (FIG. 5) which is in turn fixed to the bicycle frame by means of the upper body 2. However, as is clear from FIG. 1, the section of cable between the two ends of the sheath 43 forms a large loop. When the cable 42 is tensioned, it tends to straighten in this section. As a result, the end 46 (FIG. 5) of the sheath 43 is urged downwardly against the base wall of the tubular shank 32a and thus causes a downward axial movement of the slidable member 32 within the cylindrical guide element 22, against the action of the spring 37. The engagement of the transverse pins 34 in the helical slots 35 means that the downward movement of the slidable body 32 is accompanied by a corresponding rotation of this body about the axis 23. Since the hub 21 of the control lever 20 is connected to the body 32 by means of the pins 34, the operation of the flexible cable 42 consequently imparts rotation and simultaneous axial movement to the control lever 20. During this movement, the orientation of the axis 9 of the lower body 8 does not change, by virtue of the further connection existing between the lower body 8 and the upper body 2, constituted by the connecting rod 48 (FIG. 6). The conformation of the helical slots 35 is selected so as to obtain the desired path of movement of the transmission wheel 11. The resulting movement of the wheel therefore has both a component parallel to the axis 10 of the rear wheel of the bicycle, which is necessary to cause derailing of the chain from one sprocket to another, and a component radial to that axis, to allow for the different diameters of the various sprockets.

FIGS. 3 and 4 illustrate the position of the derailleur in the condition which corresponds to the engagement of the chain with the sprocket of largest diameter.

As can be seen, it is possible to obtain efficient operation of the derailleur even with sprockets of greatly differing diameters, whilst at the same time keeping the dimensions of the derailleur, and in particular of the operating lever 20, relatively small.

When the tension in the flexible metal cable is relaxed, the spring 37 causes the derailleur to return towards the position which corresponds to engagement with the smaller-diameter sprockets. The arrangement of the biassing spring within the cylindrical guide element affords the further advantage of the protection of this spring from operating problems due to the deposition of dirt.

Naturally, the configuration of the helical slots 35 can be varied at the design stage to obtain whatever laws are required for the movement of the transmission wheel 11. Moreover, it is also possible to use some other type of cam device for rotating the control lever 20 as a result of the axial movement of the slidable body 32 caused by operation of the flexible cable, instead of the helical slots 35.

Finally, it is possible to provide on the same device various (for example, two) helical slots with different configurations and to provide a system for selecting engagement of the corresponding transverse pins in one or other of the slots. This solution enables the cyclist to adapt the derailleur easily to different possible requirements resulting from different selections of sprockets.

FIG. 7 is a variant of FIG. 5 which relates to a second embodiment of the invention. In FIG. 7, the parts in common with FIG. 5 are indicated by the same reference numerals. In the case of FIG. 7, the body 32 mounted slidably within the cylindrical guide element 22 is made fast with the hub 21 of the control lever 20 by means of a single transverse pin 34a. The spring 37 bears directly against the transverse pin 34a through an element 39a having an upper saddle-shaped surface and bearing at its bottom against a nut 150 screwed into a threaded hole 151 of an appendage 52 projecting from a reinforcing brace 53 formed in a single piece with the upper body 2. The cylindrical guide element 22 is inserted at its lower end in a hole 54 in the appendage 52. A cup 55 is interposed between the lower end of the spring 37 and the surface of the nut 50 and is supported by a ball 56 or by some other type of anti-slip device, for example, a thrust bearing. The shank 32a of the slidable body 32 has an end which projects from the top of the upper body 2 and to which a body 58 having the function of a crank for rotating the member 32 is fixed by a screw 57. The end 46 of the sheath 43 of the flexible cable is fixed to an appendage 59 of the upper body 2, situated in the rear region of the upper body (with reference to the direction of travel of the bicycle). The end of the flexible cable 42, however, is fixed by a screw 69 to the crank body 58 at a point which is spaced from the axis 23.

As in the solution already described, the spring 37 tends to keep the control lever 20 in its highest position. When the flexible cable 42 is tensioned, it causes the rotation of the member 34, and consequently of the control lever 20, through the crank 58. The engagement of the transverse pin 34a in the helical slots 35 causes simultaneous lowering of the control lever 20 against the action of the helical spring 37. When the tension in the cable is relaxed, the spring 37 tends to return the body 34 upwards, together with the control lever 20, causing an opposite rotation of this lever, again as a result of engagement of the transverse pin 34a in the helical slots 35.

Figure 8:
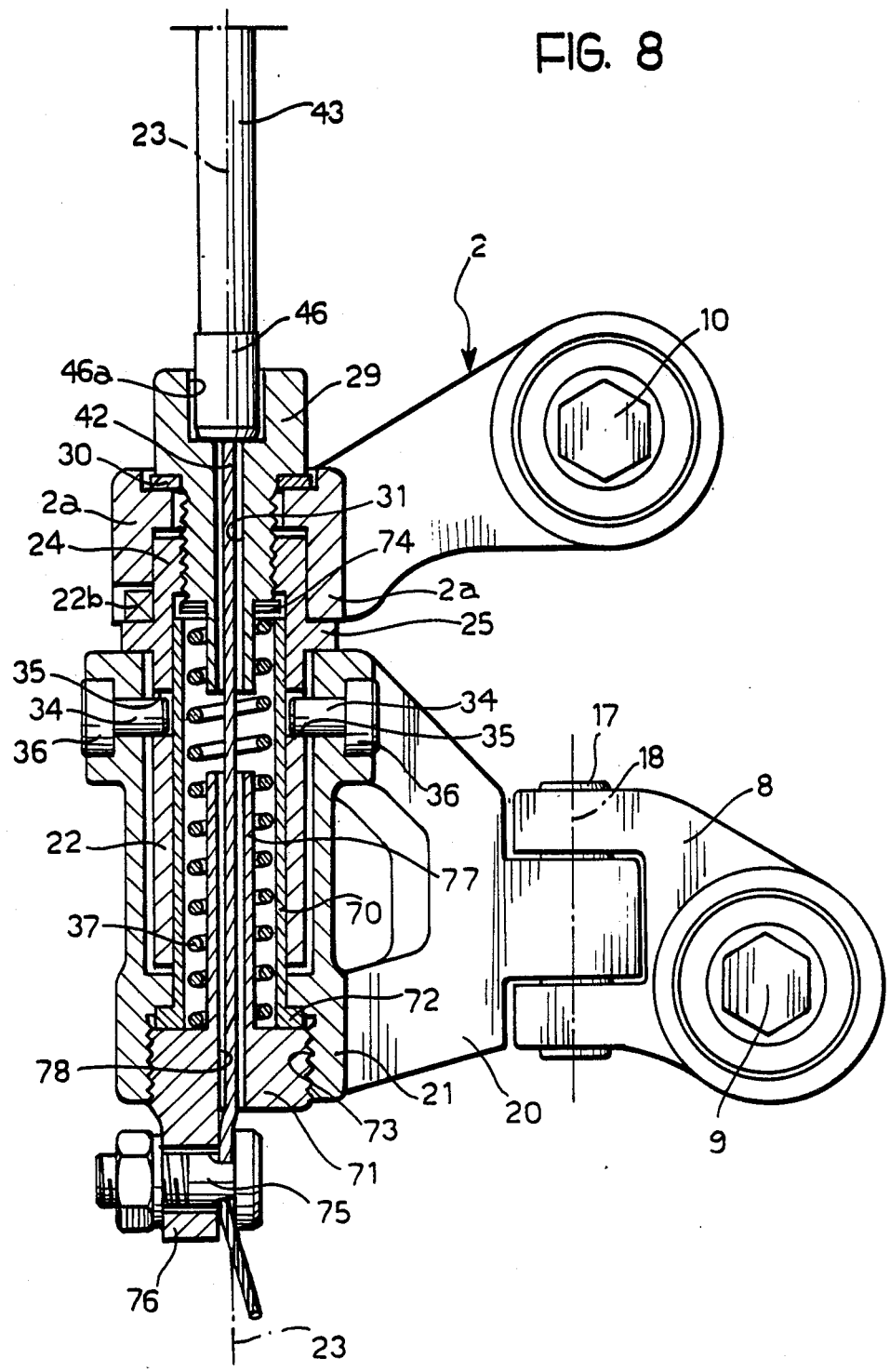

FIG. 8 illustrates a further variant of FIG. 5 which relates to a third embodiment of the invention. In this Figure also, the parts in common with FIG. 5 are indicated by the same reference numerals.

In the case of FIG. 8, an auxiliary tubular element 70 is slidably mounted within the cylindrical guide element 22 carried by the upper body 2, and its lower end is fixed to the hub 21 of the control lever 20 by means of a nut 71. The nut 71 presses an annular end flange 72 of the auxiliary tubular element 70 against the base wall of a threaded hole 73 formed axially in the lower end of the hub 21. The transverse pins 34 are carried by the hub 21 and engage the two helical slots 35 provided in the cylindrical guide element 22 from the outside. The helical spring 37 is situated within the auxiliary tubular element 70 and is interposed between the nut 71 and the lower end surface of the ring 29 used for the axial clamping of the various elements. A washer of plastics material with a low coefficient of friction, indicated 74, is interposed between the upper surface of the spring 37 and the lower surface of the ring 29. The end 46 of the sheath 43 of the flexible cable bears on the base surface of a seat 46a formed in the head of the ring 29, whilst the end of the flexible metal cable 42 is anchored by means of a bolt 75 to an appendage 76 of the nut 71. The metal cable 42 passes through the axial hole 31 of the ring 29, through a tubular bush 77 joined to the nut 71, and through an axial through-hole 78 formed in this nut.

In the case of FIG. 8, the control lever 20 is in its highest position (illustrated in the drawing) when the cable is in the condition of maximum tension. When the tension in the cable is relaxed, the lever 20 moves downwards under the biassing action of the helical spring 37. Supposing that the control lever 20 is in the position illustrated in FIG. 8 and that the tension in the cable is relaxed, the biassing spring 37 causes lowering of the auxiliary tubular element 70 together with control lever 20. The engagement of the pins 34 in the helical slots 35 causes simultaneous rotation of the control lever 20, together with the tubular auxiliary element 70, about the axis 23.

Naturally, the principle of the invention remaining the same, the forms of embodiment and details of construction may be varied widely with respect to those described and illustrated purely by way of example.

In the case of the variant illustrated in FIG. 7, for example, the appendage 59 for supporting the sheath 43 could be provided in the front region of the upper body 2 - with reference to the direction of travel of the bicycle - with the advantage that a shorter sheath 43 can be used.

A further possible variant consists of the arrangement of the axis 23 of rotation of the lever 20 so that it is inclined to a plane perpendicular to the axes 9 and 10. Furthermore, a structural solution could be produced in which the spring 37 is not arranged within the hub 21 of the lever 20. Finally, it is clear that the cam means, constituted by the helical slots 35 and the pins 34 in the examples illustrated, could be replaced by some other type of mechanism adapted to cause simultaneous rotation and axial movement of the lever 20 when a simple axial movement or a simple rotation is transmitted thereto.

I claim:

1. A rear derailleur for bicycle gears, comprising:
   an upper body which can be fixed to the bicycle frame,
   a lower body carrying transmission means for the bicycle chain and connected to the upper body so as to be movable relative thereto to bring the chain into selective engagement with a series of sprockets carried by the hub of the rear wheel of the bicycle, and
   flexible cable means for causing movement of the lower body,
   wherein it further includes a cylindrical guide element fixed to the upper body, a control lever which carries the lower body and is supported for rotation and axial sliding on the cylindrical guide element, and transmission means interposed between the flexible cable means and the control lever for simultaneously imparting rotation and axial sliding to the control lever relative to the cylindrical guide element as a result of operation of the flexible cable means, means also being provided for keeping the orientation of the lower body unchanged as the position of the control lever varies.

2. A derailleur according to claim 1, wherein the lower body of the derailleur is articulated to the control lever about an axis parallel to the axis of the cylindrical guide element, and wherein an auxiliary connecting rod is provided which also connects the lower body to the upper body, the auxiliary connecting rod having one end articulated to the lower body about an axis parallel to the axis of the cylindrical guide element and its opposite end mounted for rotation and axial sliding on the upper body.

3. A derailleur according to claim 1, wherein the transmission means comprise a member which is slidable axially relative to the cylindrical guide element and is operatively connected to the control lever, resilient biassing means against which the slidable member is operable in one direction by the flexible cable means, and cam means which interact between the cylindrical guide element and the slidable member to impart rotation to this member as a result of its axial sliding.

4. A derailleur according to claim 3, wherein the cylindrical guide element is hollow and defines a helical slot in its wall, and the slidable member is mounted within the cylindrical guide element and is provided with at least one transverse pin which engages the helical slot formed in the wall of the cylindrical guide element, the transverse pin having one end projecting from the cylindrical guide element and connected to the control lever.

5. A derailleur according to claim 4, wherein the resilient biassing means comprise a helical spring interposed between the slidable member and the base of the cylindrical guide element, and the flexible cable means comprise a flexible metal cable having one end fixed to the base wall of the cylindrical guide element and a sheath having one end operatively connected to the slidable member.

6. A derailleur according to claim 3, wherein the resilient biassing means comprise a helical spring interposed between the upper body and the control lever so as to tend to keep the latter in its lowest position relative to the upper body, and wherein the flexible cable means are adapted to raise the control lever against the action of the helical spring.

7. A derailleur according to claim 6, wherein the member which is slidable within the cylindrical guide element is constituted by an auxiliary tubular element with a lower end which projects from the cylindrical guide element and is fixed to the control lever, the cylindrical guide element defines a helical slot in its wall, the control lever is provided with at least one transverse pin which engages the helical slot in the wall of the cylindrical guide element, and respective walls fixed to the control lever and the upper body between which the helical spring is arranged within the auxiliary tubular element.

8. A derailleur according to claim 1, wherein the the slidable member is provided with two transverse pins which pass through corresponding helical slots and have their inner ends connected to the control lever.

9. A derailleur according to claim 1, wherein the transmission means comprise a member mounted for rotation relative to the cylindrical guide element and operatively connected to the control lever, a crank through which the rotatable member is operable by the flexible cable means, and cam means interacting between the guide element and the rotatable member to impart axial movement to the rotatable member as a result of its rotation.

10. A derailleur according to claim 9, wherein the cylindrical guide element is hollow, and the rotatable member is mounted within the cylindrical guide member and has a head projecting from this element and provided with the crank which is operable by the cable means.

11. A derailleur according to claim 10, wherein the upper body has an appendage, and the cable means comprise a flexible cable having one end fixed to the crank and a sheath terminating with an end which bears on the appendage of the upper body.

12. A derailleur according to claim 10, wherein a helical spring is interposed between the base of the cylindrical guide element and the rotatable member.

* * * * *